United States Patent [19]

Andersson

[11] Patent Number: 4,843,929
[45] Date of Patent: Jul. 4, 1989

[54] METHOD AND DEVICE FOR CONNECTING A HOLDER BODY WITH A TOOL HEAD

[75] Inventor: Kjell Andersson, Fagersta, Sweden

[73] Assignee: Seco Tools AB, Fagersta, Sweden

[21] Appl. No.: 114,753

[22] Filed: Oct. 30, 1987

[30] Foreign Application Priority Data

Oct. 31, 1986 [SE] Sweden .............................. 8604671

[51] Int. Cl.$^4$ .............................................. B23B 29/00
[52] U.S. Cl. ........................................ 82/160; 82/159; 82/158
[58] Field of Search ................... 82/36 A, 36 B, 36 R; 408/239 R, 239 A; 409/233; 279/37, 40, 78

[56] References Cited

U.S. PATENT DOCUMENTS

| | | | |
|---|---|---|---|
| 2,942,897 | 6/1960 | Eason | 279/37 |
| 3,762,271 | 8/1973 | Poincenot | 409/233 |
| 4,226,562 | 10/1980 | Schmid et al. | |
| 4,406,195 | 9/1983 | Krüger et al. | 82/36 B |
| 4,632,614 | 12/1986 | Rall et al. | |

FOREIGN PATENT DOCUMENTS 3243948  5/1984  Fed. Rep. of Germany .

Primary Examiner—Frederick R. Schmidt
Assistant Examiner—Lawrence Cruz
Attorney, Agent, or Firm—Burns, Doane, Swecker & Mathis

[57] ABSTRACT

A tool is clamped to a holder by a clamping mechanism carried by the holder. The clamping mechanism includes a plurality of clamping jaws having longitudinally extending shanks. The clamping jaws are actuated by a longitudinally reciprocable drawbar carried by the holder. The jaws are normally spring-biased to laterally inward, non-clamping positions and are actuated to a clamping position by means of a longitudinally movable drawbar carried by the holder. Actuation of the jaws occurs in a two-phase operation. In an initial phase, the shanks are displaced laterally outwardly so as to overlie a shoulder of the tool. In a subsequent phase, the shank is moved longitudinally into contact with the tool shoulder to clamp the tool against the holder.

13 Claims, 2 Drawing Sheets

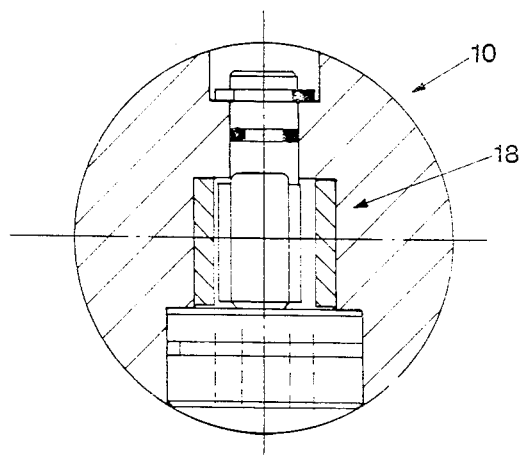
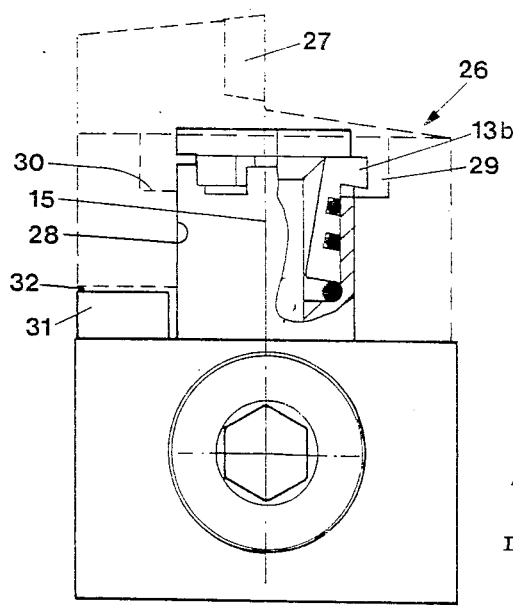
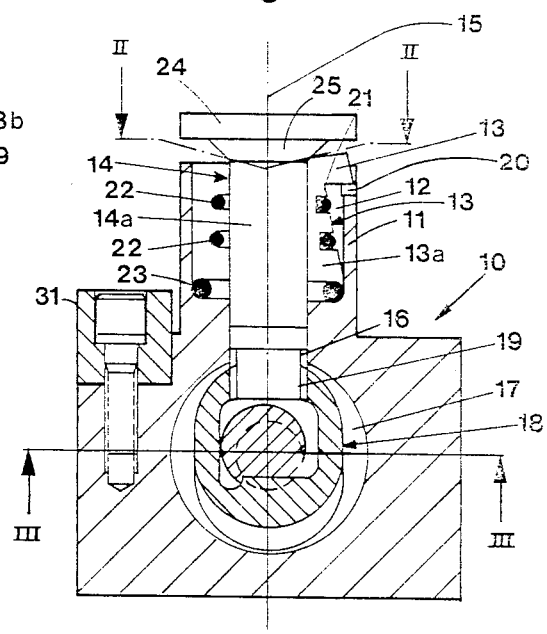

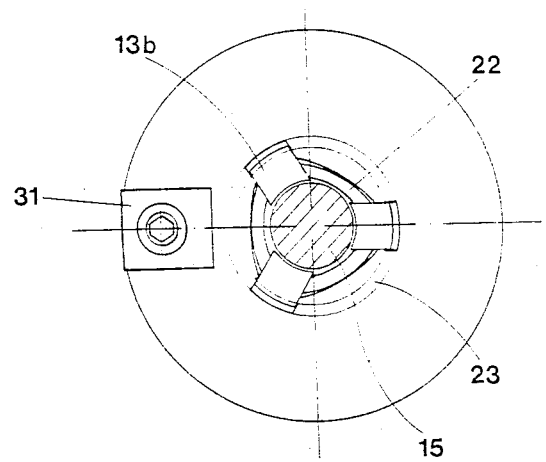
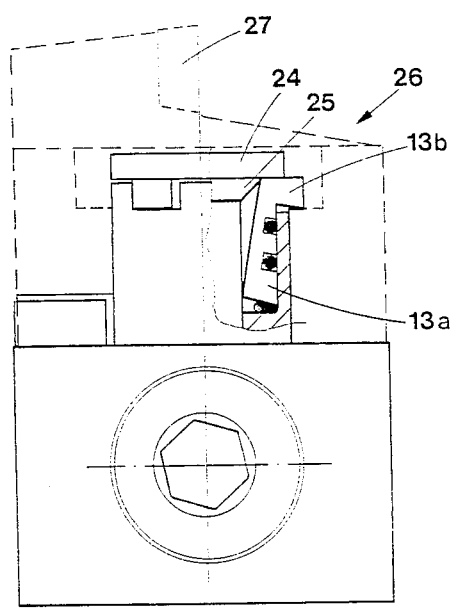

METHOD AND DEVICE FOR CONNECTING A HOLDER BODY WITH A TOOL HEAD

BACKGROUND OF THE INVENTION

This invention refers to a method and a device for connecting a holder body with a tool head, a plug of the holder body being inserted in a recess of the tool head. The device according to the invention also has a draw bar provided in connection with the plug, said draw bar having a head and a portion tapering from the head, and means for displacing the draw bar in its longitudinal direction relative to the holder body.

In U.S. Pat. No. 4,406,195 a device of the type mentioned above is disclosed. However, that device has obvious disadvantages due to the fact that the clamping force transmitted to the tool head has a radial component of considerable magnitude.

The device according to U.S. Pat. No. 4,406,195 also causes great friction losses between the draw bar, the clamping pins and the tool head.

The aim of the present invention is to disclose a method and a device of the type mentioned above, the clamping force mainly having axial direction and the friction losses between cooperating force transmitting means are eliminated.

Below an embodiment of the invention will be described, reference being made to the accompanying drawings, where FIG. 1 shows a longitudinal section of an embodiment according to the invention;

FIG. 2 shows a section along line II—II in FIG. 1;

FIG. 3 shows a section along line III—III in FIG. 1;

FIG. 4 shows an initial phase of a connection between a tool head and a holder body by means of the device according to the invention; and FIG. 5 shows the final connection between a tool head and a holder body by means of a device according to the invention.

DESCRIPTION OF A PREFERRED EMBODIMENT OF THE INVENTION

The device according to the invention as disclosed in FIGS. 1-5 comprise a holder body 10, that has a plug 11. An internal recess 12, preferably with circular cross-section, is provided in the plug 11. The plug includes longitudinally extending inner and outer surface 11a, 11b. Three clamping jaws 13 and an intermediate portion 14a of a draw bar 14 are received in the recess 12. The longitudinal center axis for the plug 11 and the draw bar 14 is designated by reference numeral 15.

From the bottom of the recess 12 a boring 16 continues, said boring having reduced diameter relative to the recess 12 in a direction from the plug 11. The boring 16 emerges in a space 17 in the holder body 10. An eccentric mechanism 18 is provided in the space 17 and connected to the draw bar 14, e.g. by means of a thread connection 19. When the eccentric mechanism 18 is activated the draw bar 14 is given a displacement towards or away from the space 17.

As is most apparent from the FIGS. 1, 4 and 5 the clamping jaws 13 are L-shaped, the stem 13a of the L extends down into the recess 12 along the draw bar 14 while the shank 13b of the L extends radially away from the draw bar in a direction transverse to the longitudinal direction of the stem 13a.

In the disclosed embodiment both the stem 13a and the shank 13b have a shape that tapers towards their joining point, seen in a plane through a clamping jaw 13 and the center axis 15 of the plug 11.

In the plug 11 slots 20 are provided, said slots extending axially from the free end of the plug 11 for a limited distance and terminating in lateral edges 11c.

The width of the slots 20 in the tangential direction of the plug 11 is somewhat bigger than the width of the shank 13b of the clamping jaws 13 in order to make it possible to displace them out through the slots 20.

The stem 13a of each of the clamping jaws 13 has grooves 21 on its side that is directed away from the intermediate portion 14a of the draw bar 14. The grooves have an extension transverse to the longitudinal direction of the stems 13a. In the disclosed embodiment two grooves 21 are arranged on each stem 13a.

A resilient O-ring 22 is received in associated grooves 21 of the stems 13a. This means that in the disclosed embodiment each O-ring 22 passes through the grooves 21. The O-rings 22 are given such a diameter that they are only slightly pre-stressed in the position of the clamping jaws 13 according to FIG. 1.

At the bottom of the recess 12 a further resilient O-ring 23 is located, said O-ring supporting the clamping jaws 13.

The draw bar 14 has a head 24 at its ends that is directed away from the plug 11 and defines a longitudinally inwardly facing contact surface 24a. A portion 25 that tapers from the head, preferably conically, constitutes a transition between the head 24 and the intermediate portion 14a of the draw bar 14 and defines a laterally outwardly facing contact surface 25a.

In FIGS. 4 and 5 a tool head 26 is drawn with dotted lines. This tool head supports in the disclosed embodiment a cutting insert 27. Within the scope of the invention other types of tool heads, e.g. a milling cutter, can be used.

The tool head 26 has an axially extending thorugh hole 28 that has a diameter that corresponds to the diameter of the plug 11, i.e. the hole 28 has a so-called slide fit relative to the plug 11.

At the end of the hole 28 that is directed towards the cutting insert 27, that hole 28 has a portion 29 with a greater diameter than the rest of the hole 28. In the transition between the portion 29 and the rest of the hole 28 a step 30 is provided, the step has an extension the radial direction relative to the center axis of the hole 28, which axis coincides with the center axis 15 of the plug 11 and the draw bar 14.

When the tool head 26 is to be connected to the holder body 10 the head 26 is pushed on the plug 11, the plug is received in the hole 28. The clamping mechanism itself is in the position according to FIG. 1.

In order to activate the device according to the invention the draw bar 14 is displaced in direction towards the space 17. This displacement is realized by means of the eccentric mechanism 18.

In the initial phase of the displacement of the draw bar 14 in direction towards the space 17 the portion 25 will cooperate with the L-shaped clamping jaws 13 so that their shanks 13b are displaced radially outwards to the position of FIG. 4 where the shanks extend through the slots 20. This radial displacement of the shanks 13b of the clamping jaws 13 is in the disclosed embodiment realized through rotation of the stem 13a around its contact point against the recess 12.

In the second phase of the displacement of the draw bar 14, in direction towards the space 17, there is a cooperation between the head 24 itself and the shank 13b that results in the an axial displacement of the clamping jaws 13 in the recess 12 in the same direction as the displacement of the draw bar 14. In connection therewith the shanks 13b of the jaws 13 come into contact with the step 30 of the tool head 26 and thereby a locking of the tool head 26 to the holder body 10 is carried out. In order to guarantee that any rotation of the tool head 26 relative the holder body 10 does not take place, a wedge 31 of the holder body 10 is intended to cooperate with a groove 32 in the tool head 26.

The force that presses the shanks 13b against the step 30 is controlled by means of the eccentric mechanism 18 and can of course be varied according to requirements.

As especially is apparent from FIG. 5, a prolongation of the O-rings 22 and a compression of the O-ring 23 in its cross-sectional direction occur when connection is effected. When the connection between the tool head 26 and the holder body 10 has expired the O-rings 22 and 23 will cause the clamping jaws to assume the position disclosed in FIG. 1.

According to the disclosed preferred embodiment the stems 13a and the shanks 13b of the clamping jaws 13 have a shape that tapers towards their joining point. For the stems 13a this makes possible the afore-described rotation around their points of contact with the recess 12 that is favourable since only the ends of the stems 13a, carrying the shanks 13b need to be displaced.

For the shanks 13b the tapering shape means that the radially outmost portion of the shanks 13b will contact the step 30 when the clamping jaws are displaced axially. This is favourable as a larger distance in radial direction between the clamping jaws gives a steadier anchoring of the tool head 26 this avoiding damage to the wall of the hole 28.

The invention is in no way restricted to the embodiment described above. Thus, instead of O-rings, springs or the like can be used as return means for the clamping jaws 13.

The tool head 26 need not be provided with a through-hole 28 but rather it is also possible to have a recess provided with a step.

The expression "tool head" is to be given a general interpretation and thus also incorporate milling heads, turning tools etc..

Also in other respects the invention can be freely varied within the scope of the appending claims.

I claim:

1. A method of securing a tool to a holder comprising the steps of:
    inserting a plug of said holder into a hole of said tool in a longitudinal direction, while shank portions of a plurality of clamping jaws movably mounted in said plug are disposed in laterally inward positions spaced laterally inwardly from a side of said hole,
    applying laterally outwardly directed forces to said shank portions during an initial clamping phase to move said shank portions to laterally outward positions in laterally overlying relationship to lateral shoulder means of said tool, and
    thereafter applying longitudinally inwardly directed forces to said shank portions during a subsequent clamping phase to move said shank portions longitudinally inwardly in a direction parallel to said longitudinal direction and into engagement with said tool shoulder for clamping said tool against said body.

2. A method according to claim 1, wherein only a laterally outermost end of each jaw contacts said tool shoulder during said subsequent clamping phase.

3. A shoulder adapted for securing a tool, said holder comprising:
    a body including a hollow plug adapted to enter a tool hole, said plug comprising a wall having longitudinally extending inner and outer surfaces, said inner surface forming a recess having a longitudinal axis, said wall including a longitudinally outwardly facing lateral edge extending from said inner surface to said outer surface,
    a drawbar extending within said plug and being reciprocably movable relative thereto along said longitudinal axis, said drawbar including:
        an intermediate portion disposed in said recess,
        a head defining longitudinally inwardly facing first contact surface means projecting laterally outwardly farther than said intermediate portion, and
        a camming portion disposed between said head and said intermediate portion and defining laterally outwardly facing second contact surface means,
    a plurality of clamping jaws disposed in said plug, each of said jaws including a stem disposed in a space between said drawbar and said inner surface, and a laterally extending shank situated at an end of said stem so as to be spaced longitudinally outwardly of said lateral edge, each of said jaws being movable relative to said plug such that said shank moves sequentially in lateral and longitudinal directions, said jaws being normally biased to laterally inward positions when said plug enters a tool hole, and
    means for displacing said drawbar longitudinally inwardly such that during an initial phase of drawbar displacement said second contact surface means contacts said jaws to move said shanks laterally outwardly from said laterally inward positions to laterally outward positions disposed laterally beyond said lateral edge to overlie tool shoulder, and during a subsequent phase of drawbar displacement said first contact surface contacts said jaws to move said shanks longitudinally inwardly in a direction parallel to said axis to clamp the tool against said body.

4. A holder according to claim 3, wherein said stem of each said jaw extends substantially parallel to said axis, said shank extending generally perpendicular relative to said stem, whereby each jaw is generally L-shaped.

5. A holder according to claim 4, wherein said stem is tapered so as to become narrowed in a longitudinally outward direction.

6. A holder according to claim 5, wherein said shank is tapered so as to become narrowed in a laterally inward direction.

7. A holder according to claim 3, wherein said first contact surface is non-perpendicular to said axis so that a laterally outermost end of each shank is disposed longitudinally forwardly of the remainder of said shank such that only said laterally outermost end contacts the tool shoulder.

8. A holder according to claim 3, wherein said second contact surface is of conical shape.

9. A holder according to claim 3 including elastically yieldable means biasing said jaws laterally inwardly.

10. A holder according to claim 9, wherein said elastically yieldable means comprises at least one O-ring encompassing all of said jaws.

11. A holder according to claim 10, wherein there are a plurality of said O-rings seated in corresponding grooves in said stems.

12. A holder according to claim 3, wherein said head lies in a plane disposed perpendicular to said axis.

13. A holder according to claim 3, wherein said drawbar displacing means comprises an eccentric drive mechanism.

* * * * *